United States Patent
Goergen

(10) Patent No.: US 12,189,448 B2
(45) Date of Patent: *Jan. 7, 2025

(54) MODULAR POWER CONTROLLER

(71) Applicant: Cisco Technology, Inc., San Jose, CA (US)

(72) Inventor: Joel Richard Goergen, Soulsbyville, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,198

(22) Filed: Nov. 13, 2023

(65) Prior Publication Data

US 2024/0077923 A1    Mar. 7, 2024

Related U.S. Application Data

(63) Continuation of application No. 16/746,342, filed on Jan. 17, 2020, now Pat. No. 11,853,138.

(51) Int. Cl.
*G06F 1/26* (2006.01)
*H01R 13/66* (2006.01)
*H04L 12/10* (2006.01)

(52) U.S. Cl.
CPC ............ *G06F 1/266* (2013.01); *H01R 13/66* (2013.01); *H01R 2201/04* (2013.01); *H04L 12/10* (2013.01)

(58) Field of Classification Search
CPC ..... G06F 1/266; H01R 13/66; H01R 2201/04; H04L 12/10; H04L 12/40045
See application file for complete search history.

(56) References Cited

U.S. PATENT DOCUMENTS

| | | | |
|---|---|---|---|
| 3,335,324 A | 8/1967 | Buckeridge | |
| 4,811,187 A | 3/1989 | Nakajima et al. | |
| 5,652,893 A | 7/1997 | Ben-Meir et al. | |
| 5,793,628 A | 8/1998 | Koch | |
| 6,008,631 A | 12/1999 | Johari | |
| 6,220,955 B1 | 4/2001 | Posa | |
| 6,259,745 B1 | 7/2001 | Chan | |
| 6,636,538 B1 | 10/2003 | Stephens | |
| 6,685,364 B1 | 2/2004 | Brezina et al. | |

(Continued)

FOREIGN PATENT DOCUMENTS

| | | |
|---|---|---|
| CN | 1209880 C | 7/2005 |
| CN | 201689347 U | 12/2010 |

(Continued)

OTHER PUBLICATIONS

Adapa R., et al., "Dynamic Thermal Rating of Substation Terminal Equipment," CIGRE, Jan. 2004, 8 Pages.

(Continued)

*Primary Examiner* — Jaweed A Abbaszadeh
*Assistant Examiner* — Brian J Corcoran

(57) ABSTRACT

In one embodiment, a power control block includes a power input for receiving pulse power from a power source, a power output coupled to a transmission line connector, a pulse power module operable to receive the pulse power and transmit the pulse power to the power output, a Power over Ethernet (PoE) module operable to receive the pulse power and transmit PoE to the power output, and a power controller for selecting the pulse power module to deliver the pulse power to the power output or the PoE module to deliver the PoE to the power output.

20 Claims, 8 Drawing Sheets

(56) References Cited

U.S. PATENT DOCUMENTS

| | | |
|---|---|---|
| 6,784,790 B1 | 8/2004 | Lester |
| 6,826,368 B1 | 11/2004 | Koren et al. |
| 6,855,881 B2 | 2/2005 | Khoshnood |
| 6,860,004 B2 | 3/2005 | Hirano et al. |
| 7,325,150 B2 | 1/2008 | Lehr et al. |
| 7,420,355 B2 | 9/2008 | Liu et al. |
| 7,490,996 B2 | 2/2009 | Sommer |
| 7,492,059 B2 | 2/2009 | Peker et al. |
| 7,509,505 B2 | 3/2009 | Randall et al. |
| 7,566,987 B2 | 7/2009 | Black et al. |
| 7,583,703 B2 | 9/2009 | Bowser et al. |
| 7,589,435 B2 | 9/2009 | Metsker et al. |
| 7,593,747 B1 | 9/2009 | Karam et al. |
| 7,603,570 B2 | 10/2009 | Schindler et al. |
| 7,616,465 B1 | 11/2009 | Vinciarelli |
| 7,813,646 B2 | 10/2010 | Furey |
| 7,835,389 B2 | 11/2010 | Yu et al. |
| 7,854,634 B2 | 12/2010 | Filipon et al. |
| 7,881,072 B2 | 2/2011 | DiBene, II et al. |
| 7,915,761 B1 | 3/2011 | Jones et al. |
| 7,921,307 B2 | 4/2011 | Karam et al. |
| 7,924,579 B2 | 4/2011 | Arduini |
| 7,940,787 B2 | 5/2011 | Karam |
| 7,973,538 B2 | 7/2011 | Karam |
| 8,020,043 B2 | 9/2011 | Karam |
| 8,037,324 B2 | 10/2011 | Hussain |
| 8,081,589 B1 | 12/2011 | Gilbrech et al. |
| 8,184,525 B2 | 5/2012 | Karam |
| 8,276,397 B1 | 10/2012 | Carlson et al. |
| 8,279,883 B2 | 10/2012 | Diab et al. |
| 8,310,089 B2 | 11/2012 | Schindler et al. |
| 8,319,627 B2 | 11/2012 | Chan et al. |
| 8,345,439 B1 | 1/2013 | Goergen et al. |
| 8,350,538 B2 | 1/2013 | Cuk |
| 8,358,893 B1 | 1/2013 | Sanderson et al. |
| 8,638,008 B2 | 1/2014 | Baldwin et al. |
| 8,700,923 B2 | 4/2014 | Fung |
| 8,712,324 B2 | 4/2014 | Corbridge et al. |
| 8,750,710 B1 | 6/2014 | Hirt et al. |
| 8,768,528 B2 | 7/2014 | Millar et al. |
| 8,781,637 B2 | 7/2014 | Eaves |
| 8,787,775 B2 | 7/2014 | Earnshaw |
| 8,829,917 B1 | 9/2014 | Lo et al. |
| 8,836,228 B2 | 9/2014 | Xu et al. |
| 8,842,430 B2 | 9/2014 | Hellriegel et al. |
| 8,849,471 B2 | 9/2014 | Daniel et al. |
| 8,966,747 B2 | 3/2015 | Vinciarelli et al. |
| 9,019,895 B2 | 4/2015 | Li et al. |
| 9,024,473 B2 | 5/2015 | Huff et al. |
| 9,184,795 B2 | 11/2015 | Eaves |
| 9,189,036 B2 | 11/2015 | Ghoshal et al. |
| 9,189,043 B2 | 11/2015 | Vorenkamp et al. |
| 9,273,906 B2 | 3/2016 | Goth et al. |
| 9,319,101 B2 | 4/2016 | Lontka |
| 9,321,362 B2 | 4/2016 | Woo et al. |
| 9,373,963 B2 | 6/2016 | Kuznetsov |
| 9,419,436 B2 | 8/2016 | Eaves et al. |
| 9,510,479 B2 | 11/2016 | Vos |
| 9,531,551 B2 | 12/2016 | Balasubramanian et al. |
| 9,590,811 B2 | 3/2017 | Hunter, Jr. et al. |
| 9,618,714 B2 | 4/2017 | Murray |
| 9,640,998 B2 | 5/2017 | Dawson |
| 9,665,148 B2 | 5/2017 | Hamdi et al. |
| 9,693,244 B2 | 6/2017 | Maruhashi et al. |
| 9,734,940 B1 | 8/2017 | McNutt et al. |
| 9,853,689 B2 | 12/2017 | Eaves |
| 9,874,930 B2 | 1/2018 | Vavilala et al. |
| 9,882,656 B2 | 1/2018 | Sipes, Jr. et al. |
| 9,893,521 B2 | 2/2018 | Lowe et al. |
| 9,948,198 B2 | 4/2018 | Imai |
| 9,979,370 B2 | 5/2018 | Xu |
| 9,985,600 B2 | 5/2018 | Xu et al. |
| 10,007,628 B2 | 6/2018 | Pitigoi-Aron et al. |
| 10,028,417 B2 | 7/2018 | Schmidtke et al. |
| 10,128,764 B1 | 11/2018 | Vinciarelli |
| 10,248,178 B2 | 4/2019 | Brooks et al. |
| 10,263,526 B2 | 4/2019 | Sandusky et al. |
| 10,407,995 B2 | 9/2019 | Moeny |
| 10,439,432 B2 | 10/2019 | Eckhardt et al. |
| 10,541,543 B2 | 1/2020 | Eaves |
| 10,541,758 B2 | 1/2020 | Goergen et al. |
| 10,631,443 B2 | 4/2020 | Byers et al. |
| 10,672,537 B2 | 6/2020 | Goergen et al. |
| 10,732,688 B2 | 8/2020 | Goergen et al. |
| 10,735,105 B2 | 8/2020 | Goergen et al. |
| 10,809,134 B2 | 10/2020 | Bullock et al. |
| 10,958,471 B2 | 3/2021 | Goergen et al. |
| 2001/0024373 A1 | 9/2001 | Cuk |
| 2002/0126967 A1 | 9/2002 | Panak et al. |
| 2004/0000816 A1 | 1/2004 | Khoshnood |
| 2004/0033076 A1 | 2/2004 | Song et al. |
| 2004/0043651 A1 | 3/2004 | Bain et al. |
| 2004/0073703 A1 | 4/2004 | Boucher et al. |
| 2004/0264214 A1 | 12/2004 | Xu et al. |
| 2005/0197018 A1 | 9/2005 | Lord |
| 2005/0268120 A1 | 12/2005 | Schindler et al. |
| 2006/0171399 A1 | 8/2006 | Ferentz et al. |
| 2006/0202109 A1 | 9/2006 | Delcher et al. |
| 2006/0209875 A1 | 9/2006 | Lum et al. |
| 2007/0103168 A1 | 5/2007 | Batten et al. |
| 2007/0132487 A1 | 6/2007 | Kestelli |
| 2007/0236853 A1 | 10/2007 | Crawley |
| 2007/0263675 A1 | 11/2007 | Lum et al. |
| 2007/0284946 A1 | 12/2007 | Robbins |
| 2007/0288125 A1 | 12/2007 | Quaratiello |
| 2008/0168283 A1 | 7/2008 | Penning |
| 2008/0198635 A1 | 8/2008 | Hussain et al. |
| 2008/0229120 A1 | 9/2008 | Diab |
| 2008/0235523 A1 | 9/2008 | Hussain |
| 2008/0310067 A1 | 12/2008 | Diab et al. |
| 2010/0077239 A1 | 3/2010 | Diab et al. |
| 2010/0103943 A1 | 4/2010 | Walter |
| 2010/0117808 A1 | 5/2010 | Karam |
| 2010/0171602 A1 | 7/2010 | Kabbara et al. |
| 2010/0190384 A1 | 7/2010 | Lanni |
| 2010/0237846 A1 | 9/2010 | Vetteth |
| 2010/0290190 A1 | 11/2010 | Chester et al. |
| 2011/0004773 A1 | 1/2011 | Hussain et al. |
| 2011/0007664 A1 | 1/2011 | Diab et al. |
| 2011/0083824 A1 | 4/2011 | Rogers |
| 2011/0228578 A1 | 9/2011 | Serpa et al. |
| 2011/0266867 A1 | 11/2011 | Schindler et al. |
| 2011/0290497 A1 | 12/2011 | Stenevik |
| 2012/0064745 A1 | 3/2012 | Ottliczky |
| 2012/0170927 A1 | 7/2012 | Huang et al. |
| 2012/0201089 A1 | 8/2012 | Barth et al. |
| 2012/0231654 A1 | 9/2012 | Conrad |
| 2012/0317426 A1 | 12/2012 | Hunter, Jr. et al. |
| 2012/0319468 A1 | 12/2012 | Schneider et al. |
| 2013/0077923 A1 | 3/2013 | Peeters Weem et al. |
| 2013/0079633 A1 | 3/2013 | Peeters Weem et al. |
| 2013/0103220 A1 | 4/2013 | Eaves |
| 2013/0249292 A1 | 9/2013 | Blackwell, Jr. et al. |
| 2013/0272721 A1 | 10/2013 | Van Veen et al. |
| 2014/0111180 A1 | 4/2014 | Vladan et al. |
| 2014/0129850 A1 | 5/2014 | Paul |
| 2014/0258742 A1 | 9/2014 | Chien et al. |
| 2014/0265550 A1 | 9/2014 | Milligan et al. |
| 2014/0372773 A1 | 12/2014 | Heath et al. |
| 2015/0042243 A1 | 2/2015 | Picard |
| 2015/0078740 A1 | 3/2015 | Sipes, Jr. et al. |
| 2015/0106539 A1 | 4/2015 | Leinonen et al. |
| 2015/0115741 A1 | 4/2015 | Dawson |
| 2015/0215001 A1 | 7/2015 | Eaves |
| 2015/0215131 A1 | 7/2015 | Paul et al. |
| 2015/0323968 A1 | 11/2015 | Chong et al. |
| 2015/0333918 A1 | 11/2015 | White, III |
| 2015/0340818 A1 | 11/2015 | Scherer et al. |
| 2016/0020911 A1 | 1/2016 | Sipes, Jr. et al. |
| 2016/0064938 A1 | 3/2016 | Balasubramanian et al. |
| 2016/0111877 A1 | 4/2016 | Eaves et al. |
| 2016/0118784 A1 | 4/2016 | Saxena et al. |
| 2016/0133355 A1 | 5/2016 | Glew et al. |
| 2016/0134331 A1 | 5/2016 | Eaves |

(56) References Cited

U.S. PATENT DOCUMENTS

| | | |
|---|---|---|
| 2016/0142217 A1 | 5/2016 | Gardner et al. |
| 2016/0197600 A1 | 7/2016 | Kuznetsov |
| 2016/0241148 A1 | 8/2016 | Kizilyalli et al. |
| 2016/0262288 A1 | 9/2016 | Chainer et al. |
| 2016/0269195 A1 | 9/2016 | Coenen et al. |
| 2016/0273722 A1 | 9/2016 | Crenshaw |
| 2016/0294500 A1 | 10/2016 | Chawgo et al. |
| 2016/0294568 A1 | 10/2016 | Chawgo et al. |
| 2016/0308683 A1 | 10/2016 | Pischl et al. |
| 2016/0352535 A1 | 12/2016 | Hiscock et al. |
| 2016/0365967 A1 | 12/2016 | Tu et al. |
| 2017/0041152 A1 | 2/2017 | Sheffield |
| 2017/0041153 A1 | 2/2017 | Picard et al. |
| 2017/0054296 A1 | 2/2017 | Daniel et al. |
| 2017/0110871 A1 | 4/2017 | Foster |
| 2017/0123466 A1 | 5/2017 | Carnevale |
| 2017/0146260 A1 | 5/2017 | Ribbich et al. |
| 2017/0155517 A1 | 6/2017 | Cao |
| 2017/0155518 A1 | 6/2017 | Yang |
| 2017/0164525 A1 | 6/2017 | Chapel et al. |
| 2017/0214236 A1 | 7/2017 | Eaves |
| 2017/0229886 A1 | 8/2017 | Eaves |
| 2017/0234738 A1 | 8/2017 | Ross et al. |
| 2017/0244318 A1 | 8/2017 | Giuliano |
| 2017/0248976 A1 | 8/2017 | Møller et al. |
| 2017/0325320 A1 | 11/2017 | Wendt et al. |
| 2018/0024964 A1 | 1/2018 | Mao et al. |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello et al. |
| 2018/0102604 A1 | 4/2018 | Keith et al. |
| 2018/0123360 A1 | 5/2018 | Eaves |
| 2018/0159430 A1 | 6/2018 | Albert |
| 2018/0188712 A1 | 7/2018 | MacKay |
| 2018/0191513 A1 | 7/2018 | Hess et al. |
| 2018/0254624 A1 | 9/2018 | Son |
| 2018/0313886 A1 | 11/2018 | Mlyniec et al. |
| 2019/0267804 A1 | 8/2019 | Matan et al. |
| 2019/0272011 A1 | 9/2019 | Goergen et al. |
| 2019/0280895 A1 | 9/2019 | Mather et al. |
| 2019/0363493 A1 | 11/2019 | Sironi et al. |
| 2019/0386836 A1 | 12/2019 | Gong et al. |

FOREIGN PATENT DOCUMENTS

| | | |
|---|---|---|
| CN | 204836199 U | 12/2015 |
| CN | 205544597 U | 8/2016 |
| CN | 104081237 B | 10/2016 |
| CN | 104412541 B | 5/2019 |
| EP | 1936861 A1 | 6/2008 |
| EP | 2120443 A1 | 11/2009 |
| EP | 2693688 A1 | 2/2014 |
| WO | 9316407 A1 | 8/1993 |
| WO | 2010053542 A2 | 5/2010 |
| WO | 2017054030 A1 | 4/2017 |
| WO | 2017167926 A1 | 10/2017 |
| WO | 2018017544 A1 | 1/2018 |
| WO | 2019023731 A1 | 2/2019 |

OTHER PUBLICATIONS

Alexander, C.K., "Fundamentals of Electric Circuits," Indian Edition, McGraw Hill Education, MATLAB Examples, 2013, pp. 1-37.
Audio/video, Information and Communication Technology Equipment- Part 1: Safety requirements, International Standard, IEC 62368-1, Edition 2.0, Feb. 2014, ISBN 978-2-8322-1405-3, pp. 1-680.
Chen H., et al., "Real-Time Temperature Estimation for Power MOSEFETs Considering Thermal Aging Effects," IEEE Transactions on Device and Materials Reliability, Mar. 2014, vol. 14, No. 1, pp. 220-228.
Chen J., et al., "Buck-boost PWM Converters having Two Independently Controlled Switches," 32nd Annual EEE Power Electronics Specialists Conference, Conference Proceedings, Vancouver, Canada, New York, NY: IEEE, US, Jun. 17-21, 2001, vol. 2, pp. 736-741, DOI: 10.1109/PESC.2001.954206, ISBN 978-0-7803-7067-8 paragraph SectionIII, XP010559317.
Cheng K.W.E., et al., "Constant Frequency, Two-Stage Quasiresonant Convertor," Published in: IEE Proceedings B—Electric Power Applications, May 1, 1992, vol. 139, No. 3, pp. 227-237, 1271980 1, XP000292493,the whole document.
Eaves S.S., et al., "Network Remote Power Using Packet Energy Transfer," Sep. 2012, 5 Pages, URL: www.voltserver.com.
Eaves S.S., "Network Remote Powering Using Packet Energy Transfer," Proceedings of IEEE International Conference on Telecommunications Energy (INTELEC), Sep. 30, 2012-Oct. 4, 2012, Scottsdale, AZ, pp. 1-5.
Edelstein S., "Updated 2016 Tesla Model S also Gets New 75-kWh Battery Option," Voltserver Exhibit 1018, May 5, 2016, Archived on Jun. 19, pp. 1-3, Retrieved on Feb. 6, 2021, 2016 by Internet Archive Wayback machine at https://web.archive.org/ web/20160619001148/https://www.greencarreports.com/news/1103782_updated-2016-tesla-model-s-also-gets- new-75-kwh-battery-option.
Effects of Current on Human Beings and Livestok—Part 1: General Aspects, Technical Specification, Basic Safety Publication, IEC/TS 60479-1, Edition 4.0, Jul. 2005, ISBN 2-8318-8096-3, pp. 1-122.
"E-Link Hybrid Connector—QPC Fiber Optic," QPC Engineered Fiber Optic Solutions, pp. 1-4, [Retrieved on Dec. 21, 2017] Retrieved from URL: http://www.qpcfiber.com/product/connectors/e-link-hybrid-connector/.
Fisher Connectors: "FiberOptic Cable and Connector Solutions," pp. 1-5, [Retrieved on Dec. 21, 2017] Retrieved from URL: https://www.fischerconnectors.com/us/en/products/fiberoptic.
Hall S.H., et al., "High-Speed Digital System Design, A Handbook of Interconnect Theory and Design Practices," Voltserver Exhibit 1030, Aug. 25, Sep. 2000, pp. 1-55.
Information Technology Equipment—Safety—Part 1: General Requirements, International Standard, IEC 60950-1, Edition 2.2, May 2013, ISBN 978-2-8322-0820-5, pp. 1-648.
Juniper Networks: "Virtual Chassis Technology Best Practices," Implementation Guide, Jan. 2016, 29 pages, 8010018-009-EN, URL: https://wwwjuniper.net/us/en/local/pdf/implementation-guides/8010018-en.pdf.
Lathi B.P., et al., "Modern Digital and Analog Communication Systems," Fourth Edition, Jan. 2009, pp. 1-15.
"Low-voltage Switchgear and Controlgear—Part 1: General Rules," International Standard, Amendment 2, IEC 60947-1, Edition 5.0, Sep. 2014, ISBN 978-2-8322-1798-6, pp. 1-106.
Lumtem: "Power Over Fiber," 2015, accessed on Sep. 25, 2020, 8 Pages, Retrieved from URL: https://www.lumentum.com/sites/default/files/technical-library-items/poweroverfiber-tn-pv-ae_0,pdf.
Microsemi, "Understanding 802.3at PoE Plus Standard Increases Available Power," Voltserver Exhibit 1033, Jun. 2011, pp. 1-7.
"NFPA 70: National Electrical Code," Voltserver Exhibit 1019, National Fire Protection Association, Voltserver Exhibit 1019, published Sep. 26, 2016, 2017 Edition, pp. 1-881.
Petition for Post Grant Review of U.S. Pat. No. 10,735,105 [Public] with Exhibits, filed Feb. 16, 2021, PGR 2021-00055, pp. 1-132.
Petition for Post Grant Review of U.S. Pat. No. 10,735,105 [Public] with Exhibits, filed Feb. 16, 2021, PGR 2021-00056, pp. 1-116.
Pluribus Networks: "Pluribus VirtualWire Solution," Product Overview, PN-PO-VWS-05818, May 2018, 5 pages, URL: https://www.pluribusnetworks.com/assets/Pluribus-VirtualWire-PO-50918.pdf.
Rabe C., et al., "Data Center Power Equipment Thermal Guidelines and Best Practices," ASHRAE Technical Committee (TC) 9.9 Mission Critical Facilities, Data Centers, Technology Spaces, and Electronic Equipment, 2016, pp. 1-60.
Sedra A.S., "Microelectronic Circuits," Oxford, Seventh Edition, Voltserver Exhibit 1031, Jan. 2015, Published on Nov. 14, 2014, pp. 1-38.
Stallings W., "Data and Computer Communications," Voltserver Exhibit 1028, Macmillan Publishing Company, Fourth Edition, Jan. 1994, pp. 1-14.

(56) References Cited

OTHER PUBLICATIONS

Stran Technologies: "TFOCA GenX Hybrid 2×2 Fiber Optic - Copper Connector," Contact Strantech, pp. 1-2, [Retrieved on Dec. 21, 2017] Retrieved From URL: https://www.strantech.com/products/tfoca-genx-hybrid-2x2-fiber-optic-copper-connector/.
Tanenbaum A.S., "Computer Networks," Voltserver Exhibit 1027, Prentice Hall PTR, Third Edition, Mar. 1996, pp. 1-12.
Yenchek M.R., et al., "Thermal Modeling of Portable Power Cables," RI9463, https://www.osti.gov/biblio/6324650, Jan. 1993, 24 pages.
Zhang K., et al., "Machine Learning-Based Temperature Prediction for Runtime Thermal Management across System Components," IEEE Transactions on Parallel and Distribute, Mar. 2016, pp. 1-15.

MODULAR POWER CONTROLLER

CROSS REFERENCE TO RELATED APPLICATION

This application is a continuation of U.S. application Ser. No. 16/746,342, filed Jan. 17, 2020, the entirety of which is incorporated herein by reference.

TECHNICAL FIELD

The present disclosure relates generally to power control, and more particularly, to a modular power controller.

BACKGROUND

Delivery of power in a Power over Ethernet (PoE) system is often accomplished using a single power circuit due to limited PCB (Printed Circuit Board) space. The circuit is used to power everything and is typically not flexible to support additional functions.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
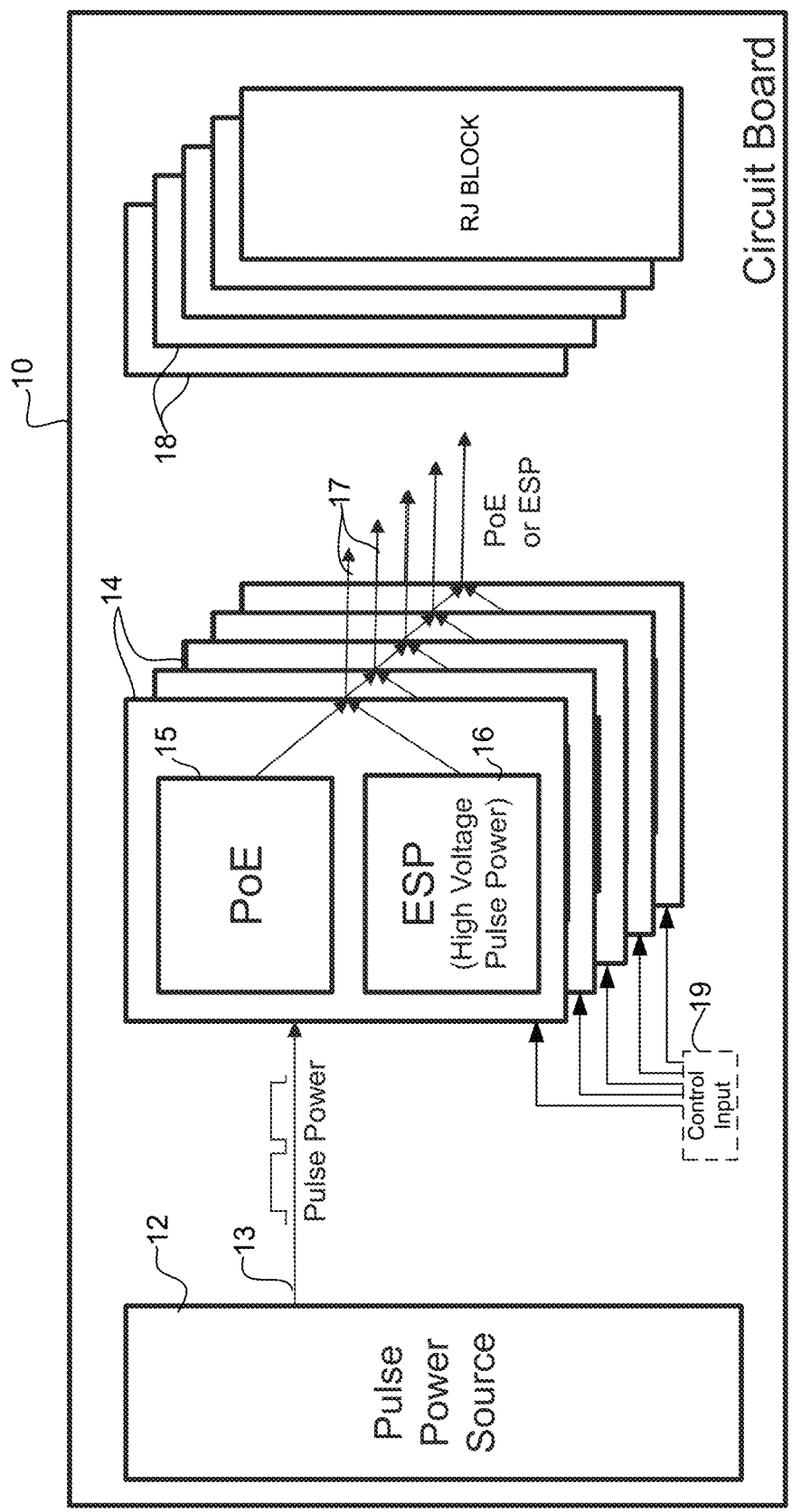
FIG. 1 is a block diagram illustrating an example of a modular power control system, in accordance with one embodiment.

In one embodiment, a power control block generally comprises a power input for receiving pulse power from a power source, a power output for delivering the pulse power or Power over Ethernet (PoE) to a transmission line connector, a pulse power module operable to receive the pulse power and transmit the pulse power to the power output, a PoE module operable to receive the pulse power and transmit the PoE to the power output, and a power controller for selecting the pulse power module to deliver the pulse power to the power output or the PoE module to deliver the PoE to the power output.

In one or more embodiments, the power control block is mounted on a circuit board and coupled to the transmission line connector through the circuit board.

In one or more embodiments, the pulse power comprises high voltage pulse power at a voltage above 56 volts.

In one or more embodiments, the pulse power comprises multi-phase pulse power.

In one or more embodiments, the power control block further comprises a second power output, wherein the power controller is operable to select the PoE module or the pulse power module for delivery of the PoE or pulse power at each of the power outputs.

In one or more embodiments, the power control block further comprises two power connectors coupled to the power input.

In one or more embodiments, the power control block further comprises a power connector coupled to the power input and configured for connection with the power connector of another power control block. The power connector is operable to transmit or receive the pulse power between the power control blocks.

In one or more embodiments, the power control block and another power control block are mounted on a circuit board with a plurality of transmission line connectors.

In one or more embodiments, the transmission line connector comprises an RJ block for receiving a plug coupled to an Ethernet cable.

In another embodiment, a power control block generally comprises a power input for receiving a first type of power from a power source, a first power delivery module for delivering the first type of power, a second power delivery module for converting the first type of power to a second type of power and delivering the second type of power, a power output for transmitting one of the first type of power or the second type of power to a transmission line connector, and a power controller for selecting the first power delivery module for delivery of the first type of power or the second power delivery module for delivery of the second type of power to the power output. The power control block is configured for mounting on a circuit board comprising the transmission line connector.

In yet another embodiment, a method generally comprises receiving pulse power at a power control block mounted on a circuit board, selecting from a first type of power and a second type of power for delivery at an output of the power control block, and transmitting one of the first type of power or the second type of power from the output of the power control block to a transmission line connector mounted on the circuit board.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Delivering power to a transmission line connector (e.g., RJ connector block) for Power over Ethernet (PoE) is often difficult and not very flexible since printed circuit board (PCB) layers have limited space.

The embodiments described herein provide power delivery through a modular power control block, which may be programmed to deliver different types of power (e.g., PoE, pulse power) to a transmission line connector. As described in detail below, the power control blocks may be coupled together, thereby avoiding bus bars and the use of copper on the PCB.

The embodiments described herein operate in the context of a data communications network including multiple network devices. The network may include any number of network devices in communication via any number of nodes (e.g., routers, switches, gateways, controllers, edge devices, access devices, aggregation devices, core nodes, intermediate nodes, power sourcing equipment, powered devices, or other network devices), which facilitate passage of data within the network. One or more of the network devices may comprise one or more modular power control systems described herein. The network device may further include any combination of memory, processors, power supply units, and network interfaces.

In one or more embodiments, the network may be configured for Power over Ethernet (PoE), Power over Fiber (PoF), advanced power over data, ESP (Extended Safe Power), or any other power over communications system that is used to pass electrical power along with data to allow a single cable to provide both data connectivity (electrical data, optical data, or both electrical and optical data) and electrical power to network devices such as switches, routers, wireless access points, IP (Internet Protocol) cameras, VoIP (Voice over IP) phones, video cameras, point-of-sale devices, security access control devices, residential devices, building automation, industrial automation, and many other devices.

Referring now to the drawings, and first to FIG. 1, a block diagram illustrating an example of power distribution from a power source 12 to transmission line connectors 18 (e.g., RJ connector, RJ45 connector, or other connector block) through power control blocks 14 (modules, elements, devices, circuits) is shown, in accordance with one embodiment.

In one example, pulse power at a voltage greater than 100V (e.g., 108V, 380V) or any other suitable voltage, is delivered from the power source 12 to the power control blocks 14 over transmission line 13 (e.g., one or more bus bar, wire, wire pair). In the example shown in FIG. 1, the power control blocks 14 each comprise a PoE module (device, circuit) 15 for delivering conventional PoE (e.g., at a power level≤100 W, at a voltage level<56V, according to IEEE 802.3af, IEEE 802.3at, or IEEE 802.3bt) and an ESP (Extended Safe Power) module (device, circuit) 16 for delivering high voltage pulse power.

The term "Extended Safe Power" ("ESP") as used herein refers to high power (e.g., >100 Watts (W)), high voltage (e.g., ≥56 Volts (V)) operation with pulse power delivered on one or more wires or wire pairs. In one or more embodiments, ESP includes fault detection (e.g., fault detection at initialization and between high voltage pulses), and pulse synchronization between power sourcing equipment (PSE) and a powered device (PD). The power may be transmitted with communications (e.g., bidirectional communications) or without communications.

The term "pulse power" (or "pulsed power") as used herein refers to power that is delivered in a sequence of pulses (alternating low direct current voltage state and high direct current voltage state) in which the voltage varies between a very small voltage (e.g., close to 0V, 3V) during a pulse-off interval and a larger voltage (e.g., ≥12V, ≥24V) during a pulse-on interval. High voltage pulse power (e.g., ≥56V, ≥60V, ≥300V, ~108V, ~380V) may be transmitted from power sourcing equipment to a powered device for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety. Pulse power transmission may be through cables, transmission lines, bus bars, backplanes, PCBs, and power distribution systems, for example.

In one or more embodiments, ESP may comprise pulse power transmitted in multiple phases in a multi-phase pulse power system with pulses offset from one another between wires or wire pairs to provide continuous power, as described below with respect to FIG. 5. One or more embodiments may use multi-phase pulse power to achieve less loss, with continuous uninterrupted power to the output with overlapping phase pulses to a powered device, as described in U.S. patent application Ser. No. 16/380,954 ("Multiple Phase Pulse Power in a Network Communications System"), filed Apr. 10, 2019, which is incorporated herein by reference in its entirety.

The power delivery modules 15, 16 within power control block 14 are operable to deliver different types of power (first type of power, second type of power) (e.g., power that differs in a characteristic other than only voltage or power level). In the examples described herein, module 15 is configured to deliver conventional PoE (e.g., PoE, PoE+, PoE++, UPoE (Universal PoE), SPE (Single Pair Ethernet)) and module 16 is configured to deliver ESP (e.g., pulse power, high voltage pulse power, multi-phase pulse power). It is to be understood that the voltage, power, and current levels described herein are only provided as examples and power may be delivered at different levels (volts, amps, watts) than described herein without departing from the scope of the embodiments. For example, the modules 15, 16 may be configured to deliver power as ESP (high voltage pulse power, pulse power, multi-phase pulse power), PoE, PoE+, PoE++, UPoE, SPE, or deliver power in accordance with any current standard or future standard. Also, the power control block 14 may comprise any number or configuration of power delivery modules.

The power control block 14 is programmable to select one of the modules 15, 16 for delivering power to the transmission line connector (e.g., RJ block) 18. As described below, the power control block 14 may comprise more than one output 17, with each output operable to transmit power from the PoE module 15 or the ESP module 16. Multiple outputs may be configured to deliver the same type of power (e.g., all PoE, all ESP) or different types of power (e.g., PoE at one output and ESP at another output).

The power control block 14 may receive control input 19, for example, from a central PSE controller, from the powered device, or another control input source. Selection of a type of power to deliver from the power control block 14 may be based, for example, on capability of the powered device, available power, load conditions, environmental conditions (e.g., system or component temperature), or detected faults. The PSE controller may, for example, send a message to the power control block 14 to change the type of power delivered based on changes in load requirements at the PD or identification of a fault (e.g., electrical fault, temperature exceeding specified limit) at the PD or within a cable or circuit between the PSE and PD. The power control block 14 may, for example, deliver power from one of the power delivery modules 15, 16 at startup and then change to another power delivery module based on operating conditions or a message (data, signal) received from the PSE controller or PD.

The power delivery system shown in FIG. 1 may be located at a network communications device operating as a PSE for transmitting power and data to one or more other network communications devices operating as PDs. The power delivery system shown in FIG. 1 may also be located at a network device operating as both a PD and a PSE. For example, a network device (e.g., switch) may receive ESP from a central PSE and use one or more of the power control blocks 14 to operate as a PSE and deliver ESP or PoE to one or more downstream devices (PDs). The network device receiving ESP may, for example, deliver power using PoE to electronic components such as IP cameras, VoIP phones, video cameras, point-of-sale devices, security access control devices, residential devices, building automation devices, industrial automation, factory equipment, lights (building lights, streetlights), traffic signals, and many other electrical components and devices.

Figure 2A:
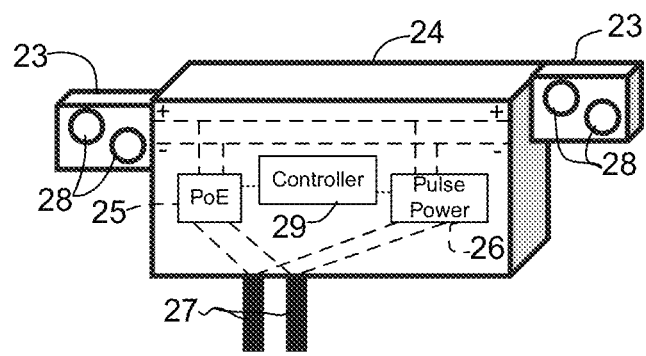
FIG. 2A is a schematic perspective of a power control block of the modular power control system of FIG. 1 with a single output, in accordance with one embodiment.
Figure 2B:
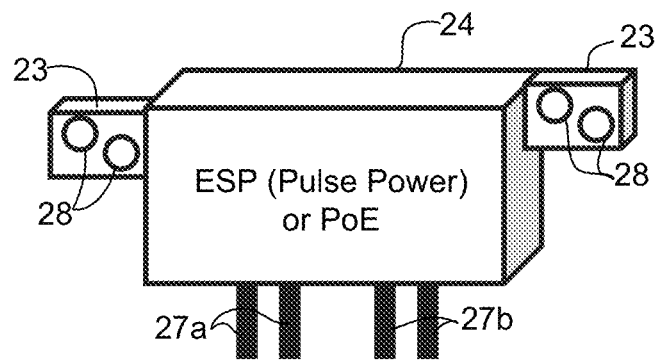
FIG. 2B is a schematic perspective of the power control block of FIG. 2A with dual output, in accordance with one embodiment.

FIGS. 2A and 2B are perspective schematics illustrating examples of a power control block 24. In one or more embodiments, the power control block 24 comprises a power input (power connector 23, power connection point 28) for receiving pulse power from a power source, a power output 27 for delivering the pulse power or PoE to a transmission line connector 38 (FIG. 3), a pulse power module 26 operable to receive the pulse power and transmit the pulse power to the power output, a PoE module 25 operable to receive the pulse power and transmit PoE to the power output, and a power controller 29 for selecting the pulse power module to deliver the pulse power to the power output or the PoE module to deliver the PoE to the power output.

In the example shown in FIG. 2A the power control block 24 comprises a main body or housing comprising the PoE module (circuit, element, components) 25 and ESP module 26 and two power connectors 23. Each power connector 23 comprises at least two power connections 28 (+,−) for coupling input power from the power source to the PoE and ESP modules 25, 26. Each of the modules 25, 26 are electrically coupled to power output 27 as shown in FIG. 2A. As previously described, the power control block 24 is programmable (e.g., operable to receive input, message, indication, instructions) at controller 29 to select one of the two modules 25, 26 for delivering power to the output 27 at one time (e.g., power transmitted from power connectors 23 to the output 27 through one of the PoE module 25 or pulse power (ESP) module 26). The output 27 may comprise one or more wires or wire pairs. In one example, the output 27 may comprise a pair of output lines (+, −).

The power delivery modules 25, 26 may include electrical circuits or components for use in transmitting the selected type of power. For example, the PoE module 25 may comprise a DC/DC converter for reducing high voltage power (e.g., 108V pulse power) received at the power control block 14 to low voltage power (e.g., 54 VDC) for delivery to the RJ connector block 18 (FIGS. 1 and 2A) and a circuit for combining multiple phases of pulse power or storing energy from pulse power to provide constant power output for delivery of conventional low voltage PoE (e.g., 54 VDC or other low voltage) from module 25.

Figure 3:
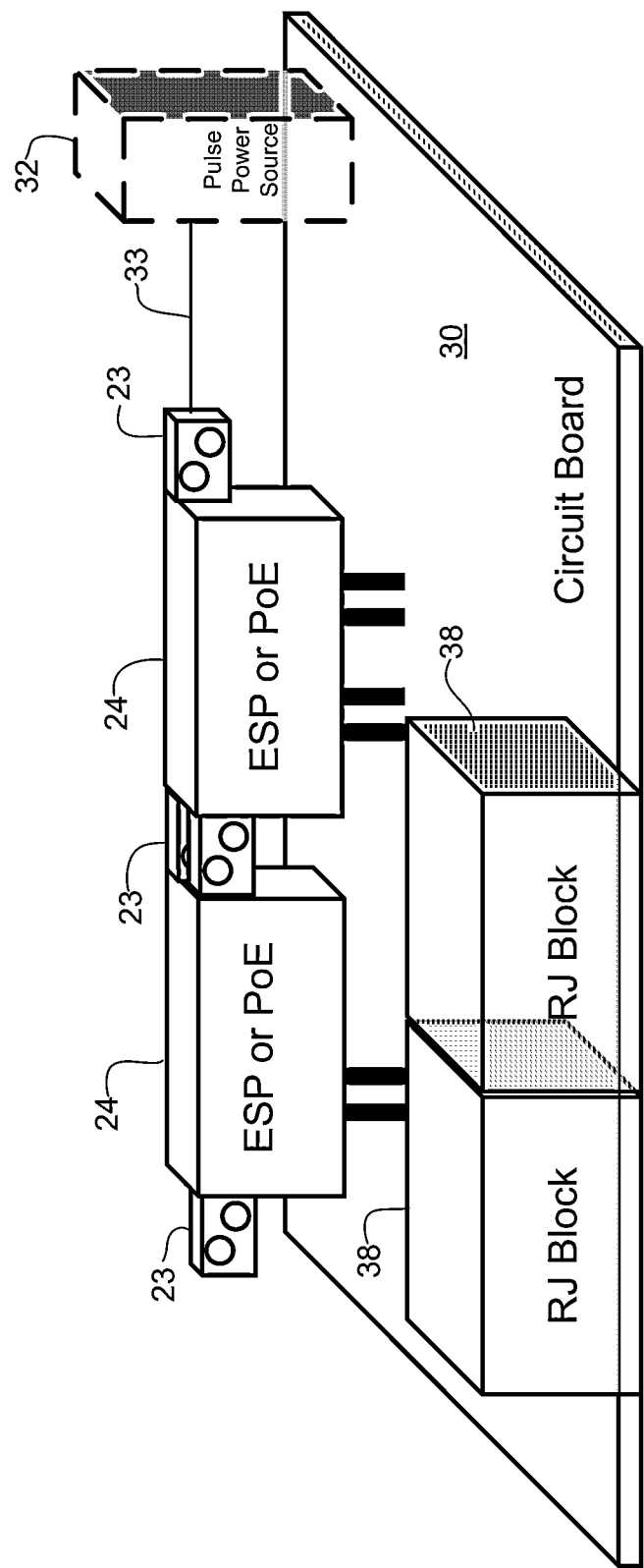
FIG. 3 is a schematic perspective illustrating mounting of power control blocks on a circuit board with transmission line connectors, in accordance with one embodiment.

In one or more embodiments, the power connectors 23 on the power control block 24 are configured to connect with one another (e.g., bolt together or other coupling means) as shown in FIG. 3. This provides for power delivery directly through the power control block 24 (from one block to another), thereby avoiding bus bars and the use of copper traces on the PCB.

As shown in FIG. 2B, the power control block 24 may comprise any number of outputs 27a, 27b. As previously noted, the outputs 27a, 27b may deliver the same type of power or different types of power (e.g., PoE module 25 delivers power to both outputs 27a, 27b, pulse power module 26 delivers power to both outputs 27a, 27b, or PoE module 25 delivers power to one output and pulse power module 26 delivers power to another output).

In one or more embodiments, the power control block 24 is configured for mounting on a circuit board (e.g., PCB) comprising the transmission line connector. FIG. 3 schematically illustrates mounting of the power control blocks 24 on circuit board 30 with transmission line connectors (RJ blocks) 38, in accordance with one embodiment. One or more pulse power sources 32 (e.g., PSU (Power Supply Unit) or other power source) may be mounted on the circuit board 30 or located in another location for transmitting high voltage power to the power control blocks 24 at power line 33. As previously described, power may be transferred from one power control block 24 to another control block through the power connectors 23 or the power source 32 (or another power source) may also deliver power to one or more power control blocks. For simplification, connections between the power control blocks 24 and the transmission line connectors 38 are not shown. Power may be transmitted through power planes and power vias in the PCB 30, for example.

In one example, the transmission line connector 38 comprises an Ethernet transmission line connector such as an RJ (Registered Jack) (e.g., RJ45 or other suitable connector comprising a plug receiving port (for receiving a plug connected to an Ethernet cable)). In one or more embodiments, an RJ block may be modified for transmitting or receiving high voltage power. The transmission line connector 38 is configured for delivering high voltage power as described herein and transmitting or receiving communications over the Ethernet cable coupled to the connector. The transmission line connector 38 may comprise any number of ports (e.g., multiple ports in a jack connector housing).

It is to be understood that the power control system shown in FIG. 3 is only an example and the system may include any number or type of power sources 32, power control blocks 24 comprising two or more power delivery modules for delivering at least a first and second type of power, and transmission line connectors 38 comprising any number of ports.

Figure 4:
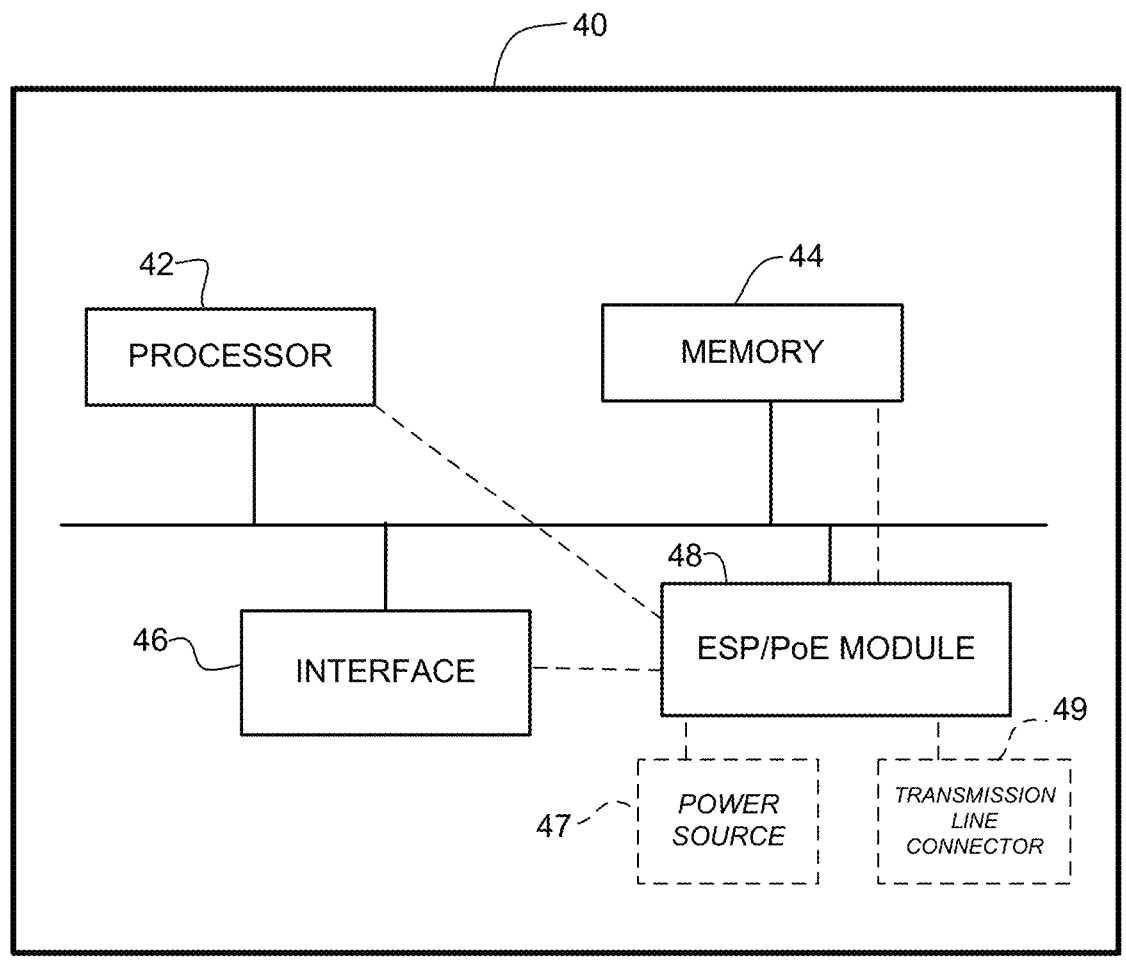
FIG. 4 is a block diagram depicting an example of a network device useful in implementing embodiments described herein.

FIG. 4 illustrates an example of a network device 40 that may be used to implement the embodiments described herein. In one embodiment, the network device 40 is a programmable machine that may be implemented in hardware, software, or any combination thereof. The network device 40 includes one or more processors 42, memory 44, interface 46, and ESP/PoE module (power control block, power delivery modules, controller) 48.

Memory 44 may be a volatile memory or non-volatile storage, which stores various applications, operating systems, modules, and data for execution and use by the processor 42. For example, components of the ESP/PoE module 48 (e.g., code, logic, or firmware, etc.) may be stored in the memory 44. The network device 40 may include any number of memory components.

The network device 40 may include any number of processors 42 (e.g., single or multi-processor computing device or system), which may communicate with a forwarding engine or packet forwarder operable to process a packet or packet header. The processor 42 may receive instructions from a software application or module, which causes the processor to perform functions of one or more embodiments described herein.

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described below with respect to the flowchart of FIG. 8 (e.g., power selection, programming of power control block). The network device 40 may include any number of processors 42.

The interface 46 may comprise any number of interfaces or network interfaces (line cards, ports, connectors) for receiving data or power, or transmitting data or power to other devices. The network interface may be configured to transmit or receive data using a variety of different communications protocols and may include mechanical, electrical, and signaling circuitry for communicating data over physical links coupled to the network or wireless interfaces. For example, line cards may include port processors and port processor controllers. The interface 46 may be configured for PoE, ESP, PoF, or similar operation.

The ESP/PoE module 48 is configured for receiving power from power source 47 and delivering power to transmission line connector 49. The ESP/PoE module 48 may include logic, firmware, software, etc. for use in selecting a type of power to deliver to each output. For example, the module 48 may comprise hardware or software for use in power selection and as previously described, may be programmable to deliver a selected type of power to a specified output at the module by selecting one of the power delivery modules. The module 48 may include, for example, control logic at a PSE controller or at the power control block for use in indicating and selecting a type of power to deliver from each output of the power control block.

It is to be understood that the network device 40 shown in FIG. 4 and described above is only an example and that different configurations of network devices may be used. For example, the network device 40 may further include any suitable combination of hardware, software, algorithms, processors, devices, components, or elements operable to facilitate the capabilities described herein.

As previously described with respect to FIG. 1, in one or more embodiments, the power transmitted to the power control block 14 and delivered from the ESP module 16 may comprise high voltage pulse power or high voltage multi-phase pulse power. FIG. 5 schematically illustrates a simplified example of voltage and current in a two-phase pulse power system. Voltage for phase A is shown at 52a and voltage for phase B is shown at 52b. The continuous phase current is shown at 54. The pulse power for each phase comprises a plurality of voltage pulses defining alternating high voltage states and low voltage states. As shown in FIG. 5, the voltage is switched between a pulse on-time (high voltage state) (e.g., voltage>24 VDC, voltage≥56 VDC, voltage≥380 VDC) and a pulse off-time (low voltage state) (e.g., voltage<12V, ≤24V). The voltage pulses are offset between phases to provide continuous power.

Figure 5:
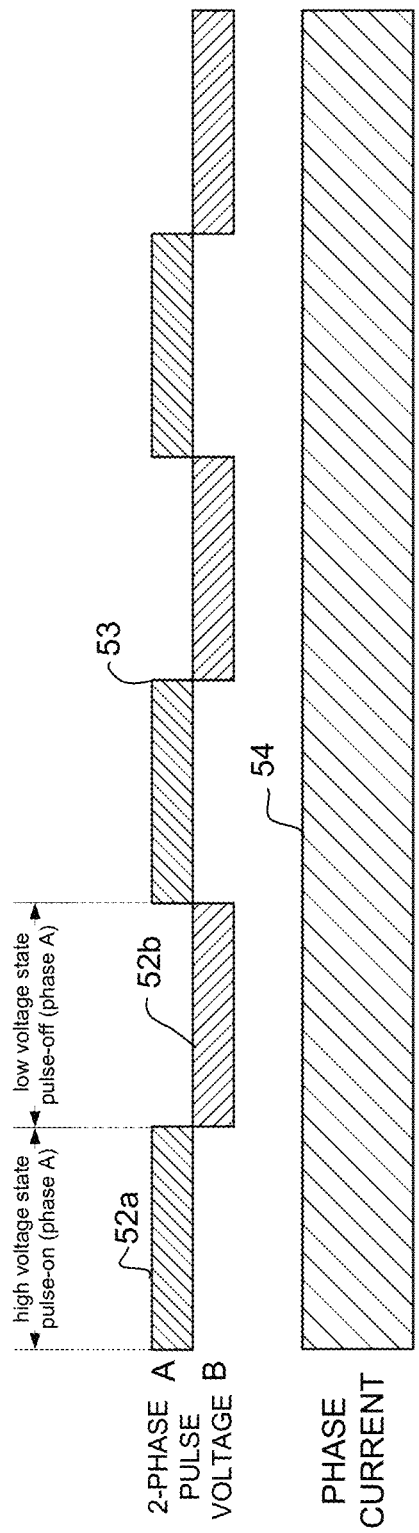
FIG. 5 illustrates a simplified example of voltage and current for a two-phase pulse power system, in accordance with one embodiment.

It is to be understood that the voltage, current, and duty cycle shown in FIG. 5 illustrate simplified examples with idealized waveforms. As previously noted, the voltage during pulse-off time may be greater than zero for use in fault detection. For example, the voltage during pulse-off time may comprise a low voltage to provide for fault sensing during pulse-off time. In one or more embodiments, the pulse-on time is greater than the pulse-off time. For example, the high voltage may be pulsed on for 4 ms and off for 1 ms. In another example, the high voltage may be pulsed on for 8 ms and off for 4 ms. Also, the voltage pulse-on times may overlap between phases so that at least one wire is on at any time. During phase overlap in the multi-phase system, the total cable current is shared across all ON wires. When the phases are combined at the PD (or at the PoE power delivery module 15), the result is continuous DC voltage as shown by the phase current 54 and 56. As described in U.S. patent application Ser. No. 16/380,954, referenced above, the multi-phase system may comprise any number of phases, with any phase offset or overlap, or duty cycle.

Figure 6:
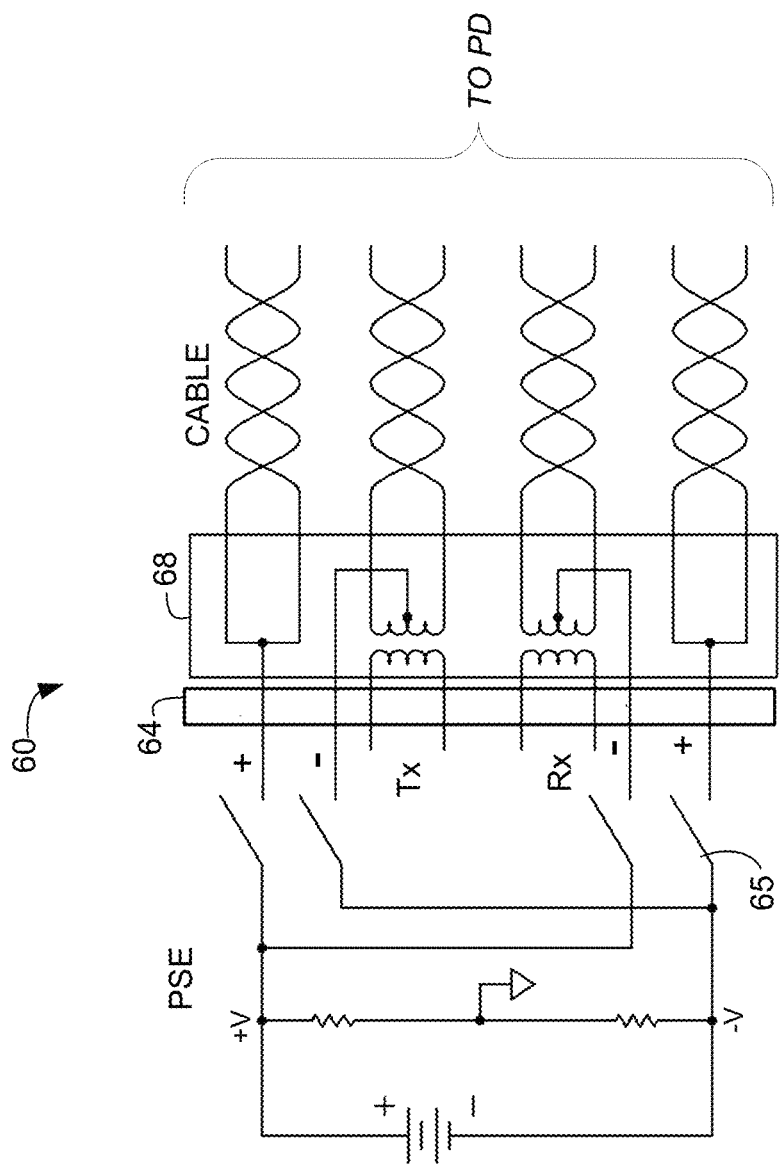
FIG. 6 illustrates a power sourcing equipment circuit with the power control block and transmission line connector, in accordance with one embodiment.

As described above with respect to FIG. 1, the power control block 14 is configured to deliver a selected type of power output (e.g., from a first power type or a second power type). In one example, the power control block 14 is operable to receive pulse power and deliver conventional PoE or pulse power. FIG. 6 illustrates an example of a circuit 60 for delivery of PoE or two-phase pulse power with four pairs of wires and a center tap arrangement. The PSE includes modulator switches 65 for implementing pulse power, as described in U.S. patent application Ser. No. 16/671,508, referenced above. The PSE is coupled to a PD (not shown) through a four-pair cable with connector 68 (e.g., RJ45 or modified RJ45 as previously described). Power control block is shown at 64.

Figure 7:
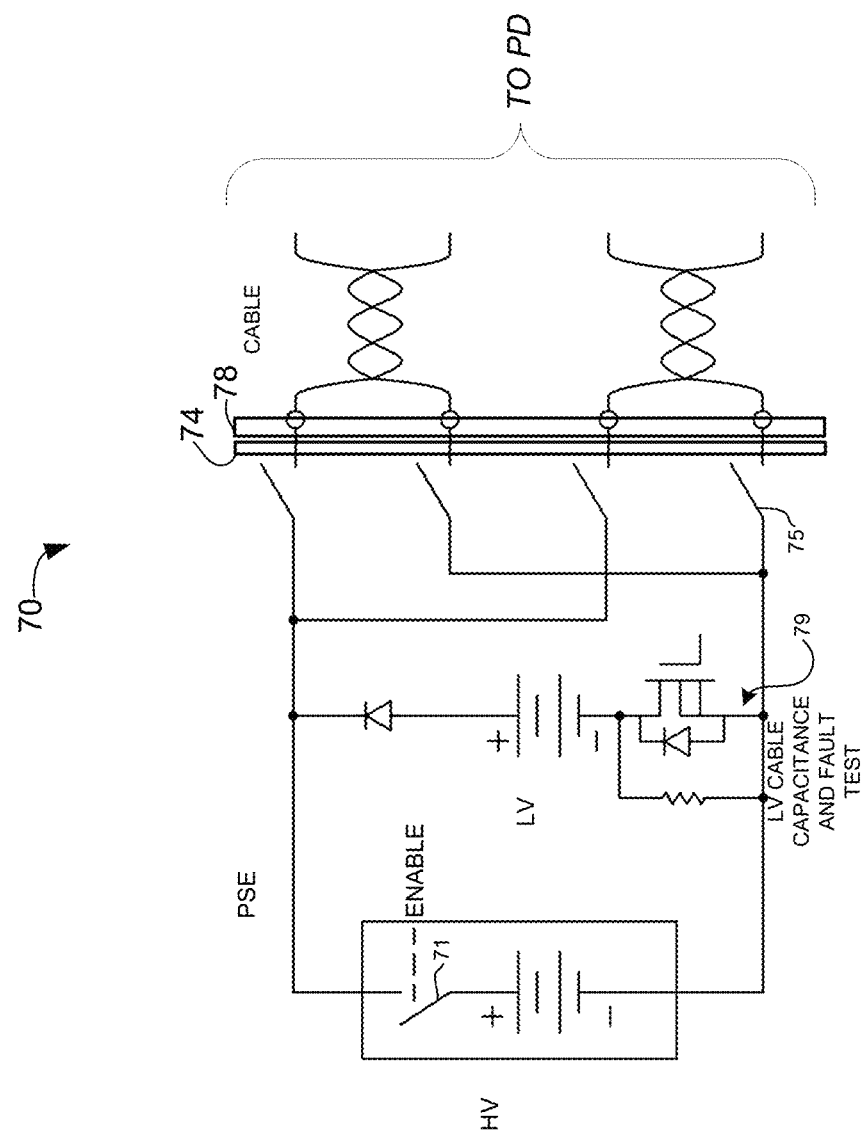
FIG. 7 illustrates another example of a power sourcing equipment circuit with the power control block and transmission line connector, in accordance with another embodiment.

FIG. 7 illustrates an example of a circuit 70 comprising two (or more) twisted pairs with PSE modulator switches 75 shown for each pair. The RJ connector 78 and power control block 74 are shown at the PSE. The pulse power may be delivered at low voltage during initialization, and after the circuit is tested (e.g., by low voltage cable capacitance and fault test circuit 79) high voltage pulse power may be delivered through the power control block 74. An enable switch 71 is open for low voltage initialization or testing and closed for high voltage operation.

It is to be understood that the circuits shown in FIGS. 6 and 7 are only examples and that the power control block may be implemented for use in different types of circuits comprising different types of elements or configured for operation at other power or voltage levels, without departing from the scope of the embodiments.

Figure 8:
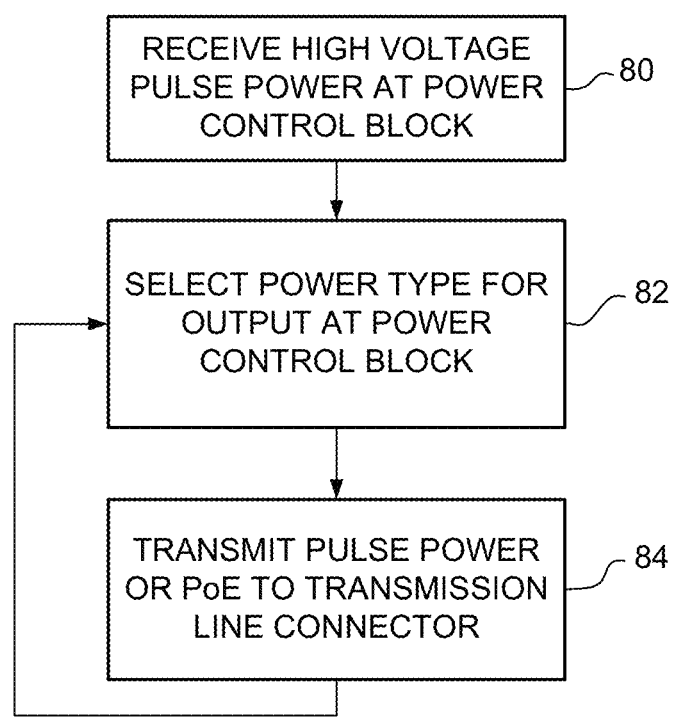
FIG. 8 is a flowchart illustrating an overview of a process for delivering power with the power control block, in accordance with one embodiment.

FIG. 8 is a flowchart illustrating an overview of a process for controlling power delivery at the power control block, in accordance with one embodiment. At step 80, the power control block receives high voltage pulse power (e.g., ≥56V). The power control block receives an indication of the type of power to be delivered for each of one or more outputs coupled to a transmission line connector (RJ connector block) (step 82). The power control block transmits the selected power (e.g., PoE or pulse power) to the transmission line connector (step 84)

It is to be understood that the process shown in FIG. 8 and described above is only an example and steps may be added, modified, or combined without departing from the scope of the embodiments.

Although the apparatus and method have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A power control block comprising:
a first power connector for receiving pulse power from a power source or a second power control block, the pulse power being received in a sequence of pulses in which power varies between a relatively small power level during a first interval and a larger power level during a second interval;
a second power connector for coupling to a third power control block and transmitting the pulse power to the third power control block;
a power output for delivering the pulse power or Power over Ethernet (POE) to a transmission line connector; and
a housing comprising:
a pulse power module operable to receive the pulse power and transmit the pulse power to the power output;
a PoE module operable to:
receive the pulse power,
convert the pulse power to PoE, and
transmit the PoE to the power output; and
a power controller operable to:
receive an input signal,
determine whether to deliver the pulse power or the PoE to the power output based on the input signal, and
select the pulse power module to deliver the pulse power to the power output or the PoE module to deliver the PoE to the power output based on determining whether to deliver the pulse power or the PoE to the power output.

2. The power control block of claim 1, wherein the power controller is operable to receive the input signal from a central controller or a powered device receiving the pulse power or the PoE.

3. The power control block of claim 1, wherein, when determining whether to deliver the pulse power or the PoE to the power output, the power controller is operable to determine whether to deliver the pulse power or the PoE to the power output based on a capability of a powered device receiving the pulse power or the PoE.

4. The power control block of claim 1, wherein, when determining whether to deliver the pulse power or the PoE to the power output, the power controller is operable to determine whether to deliver the pulse power or the PoE to the power output based on environmental conditions associated with the power control block or a powered device receiving the pulse power or the PoE.

5. The power control block of claim 1, wherein the first power connector comprises coupling means operable to couple the power control block to the second power control block.

6. The power control block of claim 5, wherein the power control block receives the pulse power from the second power control block.

7. The power control block of claim 1, wherein the power control block is operable to be mounted on a circuit board.

8. The power control block of claim 1, wherein the transmission line connector comprises an RJ block for receiving a plug coupled to an Ethernet cable.

9. The power control block of claim 1, wherein the power output includes a first power output and a second power output, wherein the first power output is coupled to the pulse power module and the second power output is coupled to the PoE module.

10. The power control block of claim 1, wherein the PoE module comprises a direct current (DC) to DC converter for reducing high voltage power to low voltage power and a circuit for combining multiple phases of pulse power or storing energy from pulse power to provide constant power output for delivery of a low voltage PoE.

11. A method comprising:
receiving, at a power connector of a power control block, pulse power from a power source or a second power control block, the pulse power being received in a sequence of pulses in which power varies between a relatively small power level during a first interval and a larger power level during a second interval;
transmitting, by the power control block, the pulse power to a third power control block coupled to the power control block;
receiving, at a power controller of the power control block, an input signal;
determining, by the power controller of the power control block, whether to deliver the pulse power or Power over Ethernet (POE) to a power output based on the input signal;
selecting, by the power controller, a pulse power module of the power control block to deliver the pulse power to the power output or a PoE module of the power control block to deliver the PoE to the power output based on determining whether to deliver the pulse power or PoE to the power output;
in response to selecting the pulse power module to deliver the pulse power:
receiving, at the pulse power module, the pulse power, and
transmitting, by the pulse power module, the pulse power to the power output;
in response selecting the PoE module to deliver the PoE:
receiving, at the PoE module, the pulse power,
converting, by the PoE module, the pulse power to PoE, and
transmitting, by the PoE module, the PoE to the power output; and
delivering, by the power output, the pulse power or PoE to a transmission line connector.

12. The method of claim 11, wherein receiving the input signal comprises receiving the input signal from a central controller or a powered device receiving the pulse power or the PoE.

13. The method of claim 11, wherein determining whether to deliver the pulse power or the PoE to the power output comprises determining whether to deliver the pulse power or the PoE to the power output based on a capability of a powered device receiving the pulse power or the PoE.

14. The method of claim 11, wherein determining whether to deliver the pulse power or the PoE to the power output comprises determining whether to deliver the pulse power or the PoE to the power output based on environmental conditions associated with the power control block or a powered device receiving the pulse power or the PoE.

15. The method of claim 11, further comprising receiving the pulse power from the second power control block coupled to the power control block.

16. The method of claim 11, wherein transmitting the pulse power to the third power control block includes transmitting the pulse power using a second power connector coupled to the third power control block.

17. The method of claim 11, wherein the power control block is operable to be mounted on a circuit board.

18. The method of claim 11, wherein the transmission line connector comprises an RJ block for receiving a plug coupled to an Ethernet cable.

19. The method of claim 11, wherein the power output includes a first power output and a second power output, wherein the first power output is coupled to the pulse power module and the second power output is coupled to the PoE module.

20. The method of claim 11, wherein the PoE module comprises a direct current (DC) to DC converter for reducing high voltage power to low voltage power and a circuit for combining multiple phases of pulse power or storing energy from pulse power to provide constant power output for delivery of a low voltage PoE.

* * * * *